United States Patent Office 3,836,479
Patented Sept. 17, 1974

3,836,479
SHAPED HYDROFLUORINATION CATALYST AND PROCESS OF MAKING THE SAME
Heinrich Paucksch and Joachim Massonne, Hannover, and Helmuth Derleth, Sarstedt, Germany, assignors to Kali-Chemie Aktiengesellschaft, Hannover, Germany
No Drawing. Filed Feb. 2, 1972, Ser. No. 223,006
Claims priority, application Germany, Feb. 8, 1971, P 21 05 748.7
Int. Cl. B01j *11/78*
U.S. Cl. 252—433
7 Claims

ABSTRACT OF THE DISCLOSURE

A shaped catalyst body for hydrofluorination comprising a hydrofluorinated body composed of a mixture of aluminum oxide hydrate or aluminum hydroxide with 2 to 60% by weight of boron trioxide relative to the starting mixture.

The catalyst body is made by forming the mixture of the above materials, softening the mixture to a degree that it can be shaped, shaping it and then drying the shaped body at a temperature between 120–200° C. followed by activating the catalyst with hydrogen fluoride at a temperature between 200–500° C.

The catalyst is used in the hydrofluorination of acetylene, halogenated olefins and similar compounds.

BACKGROUND OF THE INVENTION

The invention relates to a hydrofluorination catalyst of high activity for use in addition reactions between hydrogen fluoride and double or triple bond compounds as well as for the exchange of chlorine or bromine which is attached to organic groups for fluorine by means of hydrogen fluoride.

Various patents exist in which hydrofluorination catalysts have been described on the basis of aluminum oxide or aluminum fluoride. For instance in Pat. 2,471,525 catalysts are proposed for reaction between acetylene and hydrogen fluoride which consist either of pelletized aluminum trifluoride or of aluminum oxide. When using these catalysts mixtures of vinylfluoride and 1,1-difluoroethane are obtained. In these reactions the portion of unreacted acetylene is considerable, in spite of the fact that the reactions are carried out at comparatively high temperatures and with a large excess of hydrogen fluoride. A particular shortcoming of this process is that in case of immediate use of the aluminum oxide catalyst water, substantial amounts of tars and gaseous byproducts are formed in the initial phase. This causes considerable difficulties for the manufacturer. The water may react with unreacted hydrogen fluoride to form highly corrosive hydrofluoride acid which can damage the apparatus. The formed tars may cause clogging up of the apparatus. The reaction of acetylene forming undesired gaseous hydrocarbons results in a poor use of the acetylene and requires additional apparatus for separating and purifying the desired products.

The attempt has therefore been made to form an aluminum fluoride which has a higher degree of activity. For instance the reaction of acetylene with hydrogen fluoride in the presence of an aluminum fluoride catalyst is disclosed in Pat. 2,673,139 which catalyst is obtained by treating aluminum chloride with hydrogen fluoride in the vapor phase.

In German published application 1,224,732 it has been proposed to employ $\beta$-, $\gamma$-, or $\delta$-aluminum fluoride or mixtures thereof which fluorides were obtained by differential heat treatment of an aluminum fluoride hydrate or by reaction of hydrogen fluoride with active aluminum oxide. Special aluminum fluoride catalysts have also been described for the exchange of chlorine and bromine in halogenated hydrocarbons against fluorine by means of hydrogen fluoride. For instance U.S. Pat. 2,748,177 discloses an aluminum fluoride for this purpose which is obtained from aluminum chloride and hydrogen fluoride. However, the activity of these catalysts is not satisfactory since acceptable yields of the desired compounds are obtained only at a comparatively low rate of flow at comparatively high temperatures. The process of making these catalysts is also complex in most cases.

In German published application 1,941,234 it has further been proposed to obtain shaped aluminum fluoride catalyst bodies by treating mixtures of activated acidic aluminum oxide and 2–20% by weight silicic acid with hyrogen fluoride at a temperature from 200–430° C. and removing the $SiO_2$ as $SiF_4$ and water. The thus obtained catalysts have a higher activity compared with the catalysts obtained solely from aluminum oxide. However their form stability does not live up to production requirements. After use for a few days a slow disintegration of the shaped products takes place. As a result there is no assurance of uniform flow conditions in the catalyst bed.

SUMMARY OF THE INVENTION

The invention resides in a shaped catalyst body for the purpose indicated which comprises a hydrofluorinated body composed of a mixture of aluminum oxide hydrate or aluminum hydroxide with 2–60% by weight of boron trioxide relative to the amounts in the starting mixture.

The invention also embraces a process of making the catalyst by forming the mixture as indicated, then softening the mixture to a degree that it can be shaped, thereupon shaping it and drying the shaped body at a temperature between 120–200° C. The catalyst is then finally activated with hydrogen fluoride at a temperature between 200–500° C.

The invention furthermore embraces a process of making fluorinated hydrocarbon compounds by reacting acetylene or a halogenated olefin having 2–4 carbon atoms with hydrogen fluoride at specific temperature ranges in the presence of the above catalyst.

The catalyst may also be used for the reaction of carbon tetrachloride with hydrogen fluoride at a definite temperature range.

DESCRIPTION OF THE INVENTION AND PREFERRED EMBODIMENTS

The catalysts of the invention make it possible to carry out the reactions at comparatively low temperatures and in particular to control the addition reactions by predetermined selection of the reaction conditions in a manner that the desired compounds are obtained with a high degree of purity or at a high yield.

For softening and plastifying the initial mixture water can be used; preferably a dilute aqueous acid such as nitric acid, sulfuric acid, formic acid or acetic acid is employed.

In contrast to the prior art processes for making this type of catalyst no activated aluminum oxide is used in the process of the invention. The starting materials rather are aluminum oxide hydrates or aluminum hydroxide which can be used with usual variations of structure. Particularly useful are aluminum oxide hydrates of the pseudo-boehmite type.

The starting materials can be used in pulverulent form as well as in a moist condition as obtained from a filter.

Instead of the boron trioxide it is also possible to use corresponding amounts of boric acid or metaboric acid.

The amount of fluid which should be added prior to shaping should only be within the limits where the moist mass obtains the necessary plasticity for the shaping operation.

The shape of the agglomerated products is not critical. They may be granulates, cylinders, tablets or grains. The thus-obtained products are then dried but are not subjected to calcination.

The then following activation reaction must be carried out in a manner that a definite temperature limit is not exceeded in the catalyst bed. It is advisable for this purpose to observe the temperature in the interior of the reactor since the measurements of the outside temperature may be considerably different from the temperature in the reaction zone.

The temperature may for instance be measured by introducing a thermo-element disposed in a protective tubing into the longitudinal axis of a tubular reaction chamber which is provided with inlets and outlets for the gaseous products. The reaction chamber may be heated electrically and the measurement of the exterior temperature may be effected likewise by a thermo-element.

This type of apparatus is desirable because the treatment of the formed bodies with hydrogen fluoride for activation of the same preferably is effected in a flow system since this permits to expel the water vapor generated in the reaction and the boron fluoride together with the hydrogen fluoride current. The activation is effected by heating the catalyst from the outside while disposed in the stream of hydrogen fluoride until the catalyst has reached the desired temperature. The temperature is then maintained for several hours while the flow of the hydrogen fluoride through the reactor is continued. The amount of hydrogen fluoride which passes through the reactor in a unit of time is adjusted to prevent exceeding of the desired activation temperature in the reaction zone. The activation reaction is complete as soon as hydrogen fluoride is no longer taken up by the catalyst.

It is possible to effect the activation reaction at temperatures between 200–500° C. However, the preferred temperature is between 300–400° C. since in this temperature range the catalysts obtained have the highest stability and activity. The total time of treatment with hydrogen fluoride depends essentially upon the amount of the charge of hydrogen fluoride and usually is between 5 and 10 hours. The initial heating can be effected for instance within 30 minutes to 1 hour.

In a preferred embodiment an inert gas such as nitrogen, carbon dioxide, air, oxygen or argon are mixed in with the hydrogen fluoride. This facilitates the adjustment of the activation temperature and at the same time makes rapid removal of the formed steam and boron fluoride from the reaction zone easier. Clogging up of the apparatus does not take place and is not to be expected because of the high volatility of the volatile products.

What occurs during the activation is not entirely clear. It has been found, though, that the pretreatment of the aluminum oxide hydrate or aluminum hydroxide with hydrogen fluoride in the process of the invention leads to the formation of aluminum fluoride. If the process is carried out properly virtually the entire amount of the initial compounds is converted to aluminum fluoride. The predominant amount of boron trioxide is converted to volatile boron fluoride and can be removed in this manner from the catalyst. There is thus obtained an aluminum fluoride catalyst with a relatively large specific surface.

It has however been found that irrespective of the amount of initial boron compound some boron will be present after the activation step in the final catalyst. Only the amount of boron that is incorporated in the catalyst depends on the initial amount of boron trioxide. The presence of boron is detectable even after use of the catalyst in hydrofluorination reactions. It can be assumed that the excellent activity of the catalyst is somewhat related to the boron present in the activated catalyst.

Amounts below 2% by weight of boron trioxide in the initial mixture have practically no influence on the improvement of the activity of the final aluminum fluoride catalyst. The activity of the catalyst thus is related to the amount of boron trioxide in the initial mixture and increases with increasing contents of boron trioxide. This is for instance indicated also by the fact that in hydrofluorination reactions at the same temperatures higher yields are obtained if the boron trioxide is increased. Preferred is an amount between 5 and 50% by weight of boron trioxide in the initial mixture.

The lifetime of the catalysts of the invention is substantial. The tendency to decomposition reactions which could lead to carbon deposits on the catalysts is minor because the hydrofluorination reaction can be carried out at comparatively low temperatures. For instance the rate of decomposition of acetylene to carbon and ethylene or similar compounds is only about 0.2%.

The reactivation of the catalyst by burning off of the carbon with air or oxygen containing mixtures can therefore be effected in conventional manner. This does not affect the activity of the catalyst.

It has also been found that the catalyst of the invention has a particularly high activity if the hydrogen fluoride activated catalyst additionally include iron between 0.05 and 10% by weight relative to the weight of the final catalyst.

This type of catalyst is made by adding an iron (III) compound in solid form in the necessary amount to the mixture of aluminum oxide hydrate or aluminum hydroxide and 2–60% by weight of boron trioxide (relative to the initial mixture). This addition is made prior to softening and plastifying the mixture. Suitable iron (III) compounds are for instance iron (III) nitrate, iron (III) carbonate or iron (III) oxide.

PROCESS OF USING

The catalysts of the invention can in the first place be used in addition reactions between hydrogen fluoride and triple bond compounds. The catalysts are particularly useful for making vinyl fluoride and 1,1-difluoroethane by reacting acetylene and hydrogen fluoride at temperatures between 100–400° C., preferably between 200–300° C.

The addition of hydrogen fluoride to acetylene is a strongly exothermic reaction. Substantially higher temperatures within the reaction zone were therefore observed than at the outside of the apparatus. For tests it is therefore necessary to consider the temperature in the interior of the reactor.

The process can be carried out in a tubular reactor which is provided with measuring devices for the exterior temperature and is of a similar type as described for making the catalyst of the invention. In carrying out the reaction the reactor filled with the catalyst is first brought up to the desired exterior temperature. A mixture of anhydrous hydrogen fluoride and acetylene at a molar ratio of 0.5:1 to 10:1 is then passed across the catalyst. The mixture of hydrogen fluoride and acetylene may be preheated or may also be diluted with a portion of the recirculated reaction product. 1,1-difluoroethane as the main product can be obtained at an interior temperature between 200 and 300° C. and a ratio of preferably 2 to 5 mols of hydrogen fluoride to one mol of acetylene.

The composition of the mixtures obtained in the reaction depends on various factors such as the initial molar ratio between acetylene and hydrogen fluoride, the amount of the catalyst charge and the reaction temperature. A 99% yield could already be obtained at an interior temperature of about 220° C. in which case an exterior temperature was measured of about 160° C. The mol ratio used between acetylene and hydrogen fluoride was 1:2.3. The high yield reaction product in this case was 1,1-difluoroethane.

By selecting other reaction conditions, e.g. an interior temperature above 250° C. and a mol ratio of HF to acetylene of 1:1 to 2:1, it is possible to obtain mixtures of vinyl fluoride and 1,1-difluoroethane at a total yield of about 99%. By using specific reaction temperatures it is possible to obtain a reaction product which contains only traces of acetylene and small amounts of undesirable hydrocarbons.

The mixtures obtained in the reaction can be separated and the individual components recovered in conventional manner, e.g. by gas chromatography, condensation, distillation or extraction. The recovered hydrogen fluoride and possibly also recovered acetylene may be recirculated.

The invention further concerns the use of the catalysts of the invention for the addition reaction between hydrogen fluoride and olefinic double bonds. Particularly the addition of hydrogen fluorides to halogen atoms such as fluorine, chlorine or bromine containing olefins leads to interesting compounds. The molar relation between hydrogen fluoride and the unsaturated compound may for instance be in the range between 1 to 10 mols HF per mol olefin and per olefinic double bond in the molecule. Even a smaller ratio is possible, if the separation steps make a total conversion of hydrogen fluoride necessary. The ratios larger than 2:1 may be useful for the dilution of the reaction mixture.

The catalysts of the invention particularly favour the addition of hydrogen fluoride to olefins which initially include one or several fluorine atoms such as vinyl fluoride, vinylidene fluoride or tetrafluoroethylene. If hydrogen fluoride is passed across the catalyst together with one of these latter compounds it is possible to start the reaction without applying external heat to the reactor. The temperature developing in the reaction between 40–100° will result in a 100% conversion to the saturated fluorocompounds.

For the hydrofluorination of chlorine and/or bromine containing olefins higher temperatures are necessary, preferably between 150–500° C. Suitable halogenated hydrocarbon are for instance trichloroethylene, 1,1-dichloroethylene, tribromoethylene or 1,1-dibromoethylene or chlorinated and/or brominated propene or butene.

The invention also concerns the use of the catalysts for the hydrofluorination of vinylfluoride with gas mixtures obtained in the reaction between acetylene and hydrogen fluoride. This reaction is carried out at temperatures between 40–200° C. and results in the conversion of the vinylfluoride to 1,1-difluoroethane. It has been found that the hydrofluorination of vinylfluoride can be carried out also if the latter is present in admixture with other inert compounds. This embodiment has the advantage that gaseous mixtures containing vinylfluoride and 1,1-difluoroethane can immediately be further hydrofluorinated whereby as final product only 1,1-difluoroethane is obtained which is contaminated with only small amounts of hydrocarbons. Minor amounts of acetylene which may be present in the gaseous mixture can likewise be converted to 1,1-difluoroethane.

The invention furthermore concerns the use of the catalysts of the invention for the reaction of chlorine and/or bromine containing hydrocarbons with hydrogen fluoride. The hydrocarbons in this case are reacted with the hydrogen fluoride at a mol ratio of at least 1:1, preferably at a mol ratio between 1:2 and 1:10, and a temperature between 100–500° C. while the catalysts of the invention are present. The starting products can be aliphatic halogenated hydrocarbons having 1–4 carbon atoms, at least 1 carbon atom of the hydrocarbons having at least two valences taken up by chlorine and/or bromine atoms. Suitable halogenated hydrocarbons are for instance methylene bromide, carbon tetrabromide, 1,1,1-trichloroethane, hexachloroethane or 1-chloro-1-bromobutane.

The following examples will further illustrate the invention.

EXAMPLE 1

Making and activation of the catalyst 1.2 kg. of pulverulent pseudoboehmite of a specific BET surface of 180 m.$^2$/g. (relative to an alumina activated at 480° C.) were mixed with 0.18 kg. of pulverulent boric acid. The mixture was then stirred into a paste with so much of 2% aqueous nitric acid that the mass could be formed and could be pressed to cylinders of a size of 3 x 10 mm. The pressed bodies were then dried at 120° C. The bulk density thereof was 0.68 kg./l. and the free volume determined with acetone was 75%.

In order to activate the catalyst 0.46 kg. of the pressed bodies were placed in a tubular nickel reactor of 33 mm. interior diameter and 1,000 mm. length. The reactor was externally heated electrically and placed in a vertical position. The longitudinal axis of the reactor was taken up by a thin nickel tube which contained the thermo-element for measuring the axial temperature profile.

A current of a gaseous mixture of 2 mol/h. of hydrogen fluoride and 1 mol/h. of nitrogen was then passed across the catalyst. The reaction temperature at the same time was brought up within a period of 30 min. to a temperature where a temperature of 350° C. developed at the gas inlet portion of the reaction zone. The exterior temperature was then adjusted to prevent exceeding of the temperature in the progressing reaction zone above 350° C.

The activation of the catalyst was complete after about 7 hours. The catalyst was then cooled while being rinsed with nitrogen and the reactor was thereafter closed against outside humidity.

EXAMPLES 2 TO 11

Addition reaction between hydrogen fluoride and acetylene.

0.46 kg. of the catalyst formed and activated as described in Example 1 were introduced in each of these examples into a tubular nickel reactor which was heated electrically from the outside and employed in a vertical position. The reactor had an inner diameter of 32 mm. and a length of 1,000 mm. Along its longitudinal axis a thin nickel tubing was disposed in which a thermo-element was placed for measuring the axial temperature profile. A gaseous mixture was then passed into the reactor consisting of hydrogen fluoride and acetylene. The molar ratio between hydrogen fluoride and acetylene was varied in the different examples between 2.1:1 and 2.4:1. The reaction in each case was initiated by heating the reactor tube. The peak temperature desired in each case was adjusted by varying the total gaseous mixture introduced into the catalyst.

The gaseous mixture obtained at the outlet of the reactor tube was then washed with water and subsequently measured with a volume counter. The composition of the gas mixture was determined by gas chromatography. The temperatures inside the reactor in each case appear together with the results obtained from the attached Table 1. With a molar ratio between hydrogen fluoride and acetylene smaller than 2 and a temperature above 250° C. mixtures of vinyl fluoride and 1,1-difluoroethane were obtained.

TABLE 1

| Example number | 2 | 3 | 4 | 5 | 6 | 7 | 8 | 9 | 10 | 11 |
|---|---|---|---|---|---|---|---|---|---|---|
| $C_2H_2$ (Nl/h.) | 8 | 8 | 8 | 8 | 9 | 9 | 12 | 12 | 14 | 16.3 |
| HF (g./h.) | 15.8 | 15.8 | 16.5 | 13.8 | 20.7 | 20.7 | 27.5 | 26.4 | 32.6 | 38.3 |
| Maximum temperature inside reactor (° C.) | 135 | 170 | 210 | 223 | 245 | 255 | 262 | 273 | 281 | 295 |
| Residence time (seconds) | | | | | 16.7 | 16.7 | 16.0 | 16.0 | 15.5 | |
| Analysis (Vol. percent): | | | | | | | | | | |
| $CH_4$ | 0.1 | 0.1 | 0.1 | 0.1 | 0.2 | 0.2 | 0.2 | 0.2 | 0.2 | 0.2 |
| $C_2H_4$ | | | Trace | 0.1 | 0.1 | 0.2 | 0.2 | 0.5 | 0.5 | 0.7 |
| $C_2H_2$ | 43.7 | 37.1 | 3.5 | 0.8 | 0.5 | 0.2 | Trace | Trace | | |
| $CH_2=CHF$ | 0.1 | 0.1 | 0.1 | 0.1 | 0.1 | 0.2 | 0.2 | 0.3 | 0.3 | 0.4 |
| $CH_3—CHF_2$ | 56.6 | 62.7 | 96.3 | 99.0 | 99.1 | 99.2 | 99.4 | 99.0 | 98.9 | 98.7 |
| $C_3H_6$ | Trace | Trace | Trace | Trace | Trace | Trace | Trace | Trace | 0.1 | 0.1 |
| $C_3H_8$ | | | | | | Trace | Trace | Trace | Trace | Trace |
| Cross-sectional charge; 1 $C_2H_2$/h./cm.$^2$ | 1.08 | 1.08 | 1.08 | 1.08 | 1.2 | 1.2 | 1.6 | 1.6 | 1.87 | 2.17 |

EXAMPLES 12 TO 15

Addition reaction between hydrogen fluoride and halogenated olefins 0.46 kg. each, of the catalyst described in Example 1 were placed into the same reaction tube as used in Examples 2 to 11. The hydrofluorination was then effected in individual tests of vinylfluoride, vinylidene-fluoride, tetrafluoroethylene and vinylchloride with hydrogen fluoride. The following Table 2 shows the individual composition of the starting mixtures and the composition of the final reaction products which have been washed with water. The maximum temperatures inside the reactor listed in tests 12 to 14 were obtained by the heat liberated by the exothermic reactions. No additional heat was supplied from the outside in these cases.

The composition of the gas mixture was determined by gas chromatography.

The catalyst was heated to about 160° C. and subsequently acetylene and anhydrous hydrogen fluoride were added in a molar relationship of 2.3:1 in an amount to provide a cross-sectional reactor charge of $C_2H_2$/h.cm.$^2$ corresponding to 1.08 (mol). The composition of the reaction product was determined by withdrawing specimens. The gas composition found is listed in mol-percent in Table 4, column (a).

The reaction product which contained also the unreacted hydrogen fluoride was then passed directly subsequently through a second reactor in which a similar amount of the same catalyst had been placed. The reactor was heated externally to a temperature between 50–150° C.

The reaction product was then washed with water and analyzed. Columns (b) and (c) of the following Table 4 show that even small amounts of vinylfluoride are almost completely converted to 1,1-difluoroethane.

TABLE 2

| Example number | 12 | 13 | 14 | 15 |
|---|---|---|---|---|
| Starting compound | $CH_2=CHF$ | $CH_2=CF_2$ | $CF_2=CF_2$ | $CH_2=CHCl$ |
| (Nl/h.) | 16 | 15 | 15 | 15 |
| HF (g./h.) | 16 | 15 | 16 | 13 |
| Maximum temperature inside reactor | 55 | 65 | 60 | 175 |
| Analysis (volume percent) | $CH_2=CHF$, 0.0 | $CH_2=CF_2$, 0.0 | $CF_2=CF_2$, 0.0 | $CH_2=CHCl$, 72.0 |
| Do | $CH_3—CHF_2$, 100.0 | $CH_3—CF_3$, 100.0 | $CHF_2—CF_3$, 100.0 | $CH_3—CHFCl$, 26.0 |
| Do | | | | $CH_3—CHF_2$, 2.1 |

EXAMPLES 16 and 17

Exchange of chlorine for fluorine

Hydrogen fluoride and carbon tetrachloride were passed across a catalyst formed as described in Example 1. The reaction was again carried out in a tubular reactor as described in Examples 2 to 11. The tests were carried out at different temperatures, molar relations and residence times. The gaseous reaction mixture passing from the outlet of the reactor was washed with water and subjected to gas chromatographic analysis. The results obtained appear from the following Table 3.

TABLE 3

| Example number | 16 | 17 |
|---|---|---|
| Mol ratio HF: $CCl_4$ | 5.1 | 2.5 |
| Maximum temperature inside reactor (° C.) | 368 | 190 |
| Residence time (seconds) | 20 | 28 |
| Analysis (volume percent): | | |
| $CF_3Cl$ | 1.4 | 1.3 |
| $CF_2Cl_2$ | 47.7 | 34.0 |
| $CFCl_3$ | 47.7 | 56.0 |
| $CCl_4$ | 3.2 | 8.7 |

EXAMPLE 18

In this example a tubular reactor was again used as described in Examples 2 to 11 and 0.46 kg. of the catalyst described in Example 1 were again placed in each test in the reactor. The heating coils above and below the catalyst bed extended by 15 cm. in order to obtain an approximately uniform temperature across the entire catalyst bed.

TABLE 4

| | a | b | c |
|---|---|---|---|
| Temperature inside reactor (° C.) | 230 | 50 | 150 |
| Volume percent: | | | |
| $CH_4$ | 0.1 | 0.1 | 0.1 |
| $C_2H_4$ | 0.05 | 0.05 | 0.07 |
| $C_2H_2$ | 0.0 | 0.0 | 0.0 |
| $CH_2=CHF$ | 1.5 | Trace | 0.1 |
| $CH_3—CHF_2$ | 98.4 | 99.9 | 99.7 |

EXAMPLE 19

1.2 kg. of pulverulent pseudoboehmite of a specific BET surface of 180 m.$^2$/g. (related to alumina activated at 480° C.) were mixed with 0.18 kg. of pulverulent boric acid and 0.12 kg. of pulverulent iron (III) oxide. A paste was then prepared of the mixture by a sufficient amount of a 2% aqueous nitric acid to obtain a shapable mass which then was pressed into the form of 3 x 10 mm. cylinders. The pressed bodies were subsequently dried at 120° C. The bulk density of the shaped bodies was 0.635 kg./l. and the free volume determined with acetone was 70%.

The activation of the catalyst was effected by placing 254 g. (0.4 l.) of the shaped catalyst bodies into a vertical tubular nickel reactor which was electrically heated from the outside and had an inner diameter of 32 mm. and a length of 400 mm. In its longitudinal axis a thin nickel tube was placed for accommodating a thermo-element for measuring the axial temperature profile.

The activation was carried out as in Example 1 at a temperature of 350° C. with a stream of a gaseous mixture of hydrogen fluoride and nitrogen in a molar ratio of 2:1. The activation of the catalyst was complete after about 7 hours.

In order to determine the activity of the catalyst the reactor was then heated to an outside temperature of 210° C. Subsequently a mixture consisting of 0.5 mol acetylene and 1.2 mol hydrogen fluoride was passed each hour across the catalyst. The temperature inside the reactor then rose to 265° C.

To determine the composition of the reaction product the latter was washed with water and subjected to gaseous chromatographic analysis. The gas mixture contained 0.3% by volume of $C_2H_4$, 6.7% by volume of vinyl fluoride, 93.0% by volume of 1,1-difluoroethane and traces of $CO_2$ and $CH_4$.

Without further analysis, the foregoing will so fully reveal the gist of the present invention that others can by applying current knowledge readily adapt it for various applications without omitting features which fairly constitute essential characteristics of the generic or specific aspects of this invention.

What is claimed as new and desired to be protected by Letters Patent is set forth in the appended claims.

We claim:

1. A process for the production of shaped hydrofluorination catalyst bodies which comprises preparing a mixture consisting essentially of aluminum oxide hydrate or aluminum hydroxide together with between 2 and 60% by weight of boron trioxide or an amount of metaboric or orthoboric acid that is stoichiometrically equivalent to the said amount of boron trioxide, forming the said mixture into bodies having a preselected size and shape, thereafter drying the shaped bodies at a temperature between 120 and 200° C., and subsequently activating the said shaped bodies by passing thereover a stream of hydrogen fluoride at a temperature between 200 and 500° C.

2. A process as defined in claim 1 in which the amount of boron trioxide in the initial mixture is between 5 and 50% by weight.

3. A process as defined in claim 1 in which ferric nitrate, ferric carbonate or ferric oxide is added to the initial mixture in such an amount that the iron content of the resulting catalyst is between 0.05 and 10% by weight thereof.

4. A process as defined in claim 1 in which the activation with hydrogen fluoride is effected at a temperature between 300 and 400° C.

5. A process as defined in claim 1 in which the hydrogen fluoride that is passed over the shaped bodies is diluted with an inert gas.

6. A process as defined in claim 5 in which the inert gas is nitrogen, carbon dioxide, air, oxygen, or argon.

7. A shaped hydrogenfluorination catalyst body produced in accordance with the process defined in claim 1.

References Cited

UNITED STATES PATENTS

| | | | |
|---|---|---|---|
| 2,830,959 | 4/1958 | Linn | 252—433 |
| 3,131,230 | 4/1964 | Hervert et al. | 252—433 X |
| 3,647,366 | 3/1972 | Thoonen | 252—433 X |

PATRICK P. GARVIN, Primary Examiner

U.S. Cl. X.R.

252—432; 260—653.4, 653.7